United States Patent
Chuang et al.

(10) Patent No.: US 8,352,773 B2
(45) Date of Patent: Jan. 8, 2013

(54) TIME ALIGNING CIRCUIT AND TIME ALIGNING METHOD FOR ALIGNING DATA TRANSMISSION TIMING OF A PLURALITY OF LANES

(75) Inventors: Ying-Ting Chuang, Hsinchu (TW); Kuo-Kuang Chen, Taipei County (TW)

(73) Assignee: JMicron Technology Corp., Hsin-Chu (TW)

( * ) Notice: Subject to any disclaimer, the term of this patent is extended or adjusted under 35 U.S.C. 154(b) by 413 days.

(21) Appl. No.: 12/854,181

(22) Filed: Aug. 11, 2010

(65) Prior Publication Data

US 2011/0296073 A1    Dec. 1, 2011

(30) Foreign Application Priority Data

May 31, 2010    (TW) ................................ 99117492 A

(51) Int. Cl.
*G06F 1/04* (2006.01)
(52) U.S. Cl. .................. 713/503; 714/700; 710/310
(58) Field of Classification Search .................. 714/700; 713/503, 400, 401; 710/310, 52
See application file for complete search history.

(56) References Cited

U.S. PATENT DOCUMENTS

| | | | |
|---|---|---|---|
| 6,359,815 B1 * | 3/2002 | Sato et al. ...................... | 365/198 |
| 6,578,092 B1 * | 6/2003 | Lau et al. ......................... | 710/29 |
| 6,654,824 B1 * | 11/2003 | Vila et al. ........................ | 710/60 |
| 6,871,301 B1 * | 3/2005 | Deng ............................ | 714/700 |
| 7,093,061 B2 * | 8/2006 | Teo ................................ | 711/101 |
| 7,225,354 B2 * | 5/2007 | Tseng ............................ | 713/503 |
| 7,346,798 B2 * | 3/2008 | Tseng ............................ | 713/500 |
| 7,434,114 B2 * | 10/2008 | Jang et al. ...................... | 714/700 |
| 7,454,537 B1 * | 11/2008 | Xue ................................ | 710/52 |
| 7,466,723 B2 * | 12/2008 | Vakil et al. ..................... | 370/503 |
| 7,631,118 B2 * | 12/2009 | Renaud et al. ................... | 710/52 |
| 7,870,444 B2 * | 1/2011 | Teo ................................ | 714/700 |
| 7,913,001 B2 * | 3/2011 | Renaud et al. ................... | 710/54 |
| 7,936,684 B2 * | 5/2011 | Schoenborn et al. .......... | 370/249 |
| 7,979,608 B2 * | 7/2011 | Renaud et al. ................... | 710/54 |
| 7,995,696 B1 * | 8/2011 | Norrie ........................... | 375/372 |
| 8,161,210 B1 * | 4/2012 | Norrie ............................ | 710/65 |
| 8,166,334 B2 * | 4/2012 | Lai et al. ....................... | 713/500 |
| 8,285,884 B1 * | 10/2012 | Norrie ............................ | 710/14 |
| 2005/0024926 A1 | 2/2005 | Mitchell | |
| 2007/0177701 A1 * | 8/2007 | Thanigasalam ............... | 375/372 |

OTHER PUBLICATIONS

Xilinx. Xilinx Answer 42368. Virtex-5 Integrated PCI Express Block Plus—Debugging Guide for Link Training Issues. Jul. 19, 2011.*

(Continued)

*Primary Examiner* — Matthew D Spittle
(74) *Attorney, Agent, or Firm* — Winston Hsu; Scott Margo

(57) ABSTRACT

A time aligning circuit includes a plurality of buffers, a plurality of delay selectors, a plurality of adjustment symbol generators, and a controller. Each buffer receives an ordered set on a corresponding lane. Each delay selector delays an output of the ordered set of the corresponding buffer. Each adjustment symbol generator outputs an adjustment symbol or the output received from the corresponding delay selector according to an adjustment control signal. When an initial symbol of a designated delay selector is detected but initial symbols of other delay selectors are not received yet, the controller generates the delay control signal to the designated delay selector and generates the adjustment control signal to control a designated adjustment symbol generator corresponding to the designated delay selector in order to output one adjustment symbol until initial signals of all delay selectors are detected.

10 Claims, 11 Drawing Sheets

OTHER PUBLICATIONS

Winkles, Joe. Elastic Buffer Implementations in PCI Express Devices. Nov. 2003.*

Intel Corporation. PHY Interface for the PCI Express Architecture. Version 1.00. Jun. 19, 2003.*

PCI-SIG. PCI Express Base Specification. Revision 1.0a. Apr. 15, 2003.*

* cited by examiner

TIME ALIGNING CIRCUIT AND TIME ALIGNING METHOD FOR ALIGNING DATA TRANSMISSION TIMING OF A PLURALITY OF LANES

BACKGROUND OF THE INVENTION

1. Field of the Invention

The present invention relates to a circuit for aligning data transmission and a related method, and more particularly, to a circuit for aligning data transmission timing of a plurality of lanes and a related method.

2. Description of the Prior Art

Recently, computer systems usually adopt a peer-to-peer link (such as, a peer-to-peer link defined by Peripheral Component Interconnect Express (PCI-Express)) as a two-way communication between other peripheral devices. As one skilled in the art well-known, the PCI-Express bus can use a higher operational clock and additional lanes in order to improve its data transfer performance. Please refer to FIG. 1, which is a diagram of a conventional PCI-Express bus 115 utilizing a plurality of lanes to transmit data. Suppose that a data stream 110 is transmitted from a transmitting device 100 to a receiving device 120. Since the PCI-express bus 115 can provide four lanes including LANE0, LANE1, LANE2, and LANE3, these bytes D0-D7 included in the data stream 110 together with a corresponding COM symbol are respectively transmitted via the lanes LANE0, LANE1, LANE2, and LANE3 when the transmitting device 100 outputs the data stream 110. In other words, a COM symbol together with two bytes D0 and D4 are passed to the receiving device 120 through the lanes LANE0, a COM symbol together with two bytes D1 and D5 are passed to the receiving device 120 through the lane LANE1, a COM symbol together with two bytes D2 and D6 are passed to the receiving device 120 through the lane LANE2, and a COM symbol together with two bytes D3 and D7 are passed to the receiving device 120 through the lane LANE3. In the end, the receiving device 120 is capable of acquiring the desired data stream 110 via the four lanes LANE0, LANE1, LANE2, and LANE 3.

Generally speaking, the transmitting device 100 respectively outputs ordered sets to lanes LANE0, LANE1, LANE2, and LANE3 at the same time. However, the lanes LANE0, LANE1, LANE2, and LANE3 might have different lengths and impedance owing to different circuit layouts. That is, during the data transmission, the lanes LANE0, LANE1, LANE2, and LANE3 might introduce different delays. Therefore, there is a skew existed between the data transmission timing of the lanes LANE0, LANE1, LANE2, and LANE3. In other words, even if the transmitting device 100 synchronously outputs the COM symbol to lanes LANE0, LANE1, LANE2, and LANE3, the COM symbols of lanes LANE0, LANE1, LANE2, and LANE3 are unable to arrive to the receiving device 120 at the same time. Therefore, because the transmission timing of the lanes LANE0, LANE1, LANE2, and LANE3 has skews, the receiving device 120 is unable to process bytes D0, D1, D2, and D3 transmitted via the lanes LANE0, LANE1, LANE2, and LANE3 at the same time.

Please refer to FIG. 2, which is a diagram of another conventional PCI-Express bus 215 utilizing a plurality of lanes to transmit data. In this embodiment, the operating clock applied to the transmitting device 200 is different from that of the receiving device 220. If the operating clock of the transmitting device 200 has a frequency greater than the frequency of the operating clock applied to the receiving device 220, the data transmitting rate of the data stream 210 outputted from the transmitting device 200 will be greater than the data receiving rate of the data stream 210 received by the receiving device 220, accordingly. Therefore, it may result in a data overflow. On the contrary, if the operating clock of the transmitting device 200 has a frequency less than a frequency of the operating clock applied to the receiving device 220, the data transmitting rate of the data stream 210 outputted from the transmitting device 200 will be less than the data receiving rate of the data stream received by the receiving device 220, accordingly. Therefore, it may result in a data underflow.

In order to solve the problems generated from a mismatch of the operating clocks on the transmitting device 200 and the receiving device 220, the receiving device 220 has a plurality of elastic buffers to regulate data outputted from the transmitting device 200 and transferred through lanes LANE0, LANE1, LANE2, and LANE3. Based on the specification of the PCI-Express bus, the transmitting device 200 outputs ordered sets to make the elastic buffers balance different operating clocks adopted by the transmitting device 200 and the receiving device 220. For example, each ordered set outputted from the transmitting device 200 includes a COM symbol and three SKP symbols. When an elastic buffer located on the receiving device 220 receives a plurality of ordered sets, the elastic buffer reduces the number of SKP symbols in these ordered sets if the operating clock of the transmitting device 200 has a frequency greater than that of the operating clock applied to the receiving device 220. As a result, the data transmitting rate of the transmitting device 200 is accordingly reduced, and the above data overflow problem can be avoided. However, the elastic buffer increases the number of SKP symbols in these ordered sets if the operating clock of the transmitting device 200 has a frequency less than that of the operating clock applied to the receiving device 220. Therefore, the data transmitting rate of the transmitting device 200 is accordingly boosted, and the above data underflow problem can be avoided.

However, this approach may result in inconsistency on the number of SKP symbols for each lane, such that there maybe an offset occurred in the data transmission timing of the lanes LANE0, LANE1, LANE2, and LANE3. For example, as shown in FIG. 2, the elastic buffers EB0, EB1, EB2, and EB3 are used to adjust (increase or decrease) the number of SKP symbols in ordered sets, respectively. After adjustment, the ordered sets of the lane LANE0 have one COM symbol as well as three SKP symbols, the ordered sets of the lane LANE1 have one COM symbol as well as four SKP symbols, the ordered sets of the lane LANE2 have one COM symbol as well as three SKP symbols, and the ordered sets of the lane LANE3 have one COM symbol as well as two SKP symbols. Obviously, there is an offset occurred in the data transmission timing of the lanes LANE0, LANE1, LANE2, and LANE3. In other words, the receiving device 220 is unable to process the bytes D0, D1, D2, and D3 transferred on the lanes LANE0, LANE1, LANE2, and LANE3 at the same time.

Hence, how to calibrate the data transmission timing of a plurality of lanes has become an important topic in the field of PCI-Express bus, such that the receiving device is able to extract the desired data stream correctly.

SUMMARY OF THE INVENTION

It is one of the objectives of the present invention to provide a time aligning circuit and a time aligning method for aligning data transmission timing of a plurality of lanes to solve the abovementioned data transmission timing offset problems.

According to an embodiment of the present invention, a time aligning circuit for aligning a data transmission timing of a plurality of lanes is provided. The time aligning circuit includes a plurality of buffers, a plurality of delay selectors, a plurality of adjustment symbol generators, and a control unit. The plurality of buffers are respectively coupled to the plurality of lanes, wherein each buffer is used for receiving ordered sets transmitted on the corresponding lane. The plurality of delay selectors are respectively coupled to the plurality of buffers, wherein each delay selector is used for delaying an output of the ordered sets of the corresponding buffer according to a delay control signal. The plurality of adjustment symbol generators are respectively coupled to the plurality of delay selectors, wherein each adjustment symbol generator is used for outputting an adjustment symbol or for outputting the output received from the corresponding delay selector according to an adjustment control signal. The control unit is coupled to the plurality of delay selectors and the plurality of adjustment symbols generators, for generating the delay control signal and the adjustment control signal. The control unit includes an initial symbol detector and a determining unit. The initial symbol detector is coupled to the plurality of delay selectors, for detecting an initial symbol of the ordered sets outputted from the plurality of delay selectors. The determining unit is coupled to the initial symbol detector, the plurality of delay selectors, and the plurality of adjustment symbol generators. When an initial symbol of the ordered sets outputted by a designated delay selector is detected but initial symbols of the ordered sets outputted by other delay selectors are not received yet, the determining unit generates the delay control signal to the designated delay selector and generates the adjustment control signal to control a designated adjustment symbol generator corresponding to the designated delay selector in order to output one adjustment symbol until the initial signals of the ordered sets outputted by all delay selectors are detected.

According to another embodiment of the present invention, a time aligning method for aligning a data transmission timing of a plurality of lanes is provided. The method includes the following steps: receiving ordered sets transmitted on each lane; detecting an initial symbol of the ordered sets received by the plurality of lanes; and when an initial symbol of the ordered sets on a designated lane is detected but initial symbols of the ordered sets on the other lanes are not received yet, generating a delay control signal to delay an output of the ordered sets received from the lanes and generating an adjustment control signal to control a designated adjustment symbol generator corresponding to the designated lane to output one adjustment symbol until the initial signals of the ordered sets outputted by all delay selectors are detected.

The time aligning circuit and the time aligning method provided in the present invention are capable of aligning a plurality of lanes (which can be implemented by different traces or different cables). Therefore, the offset problems of the data transmission timing caused by different lengths, temperature effects, voltage change of power supplies, different channel qualities, or data rate compensation by elastic buffers can be solved. Furthermore, by updating the accumulated values, the used space of the buffers can be further saved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
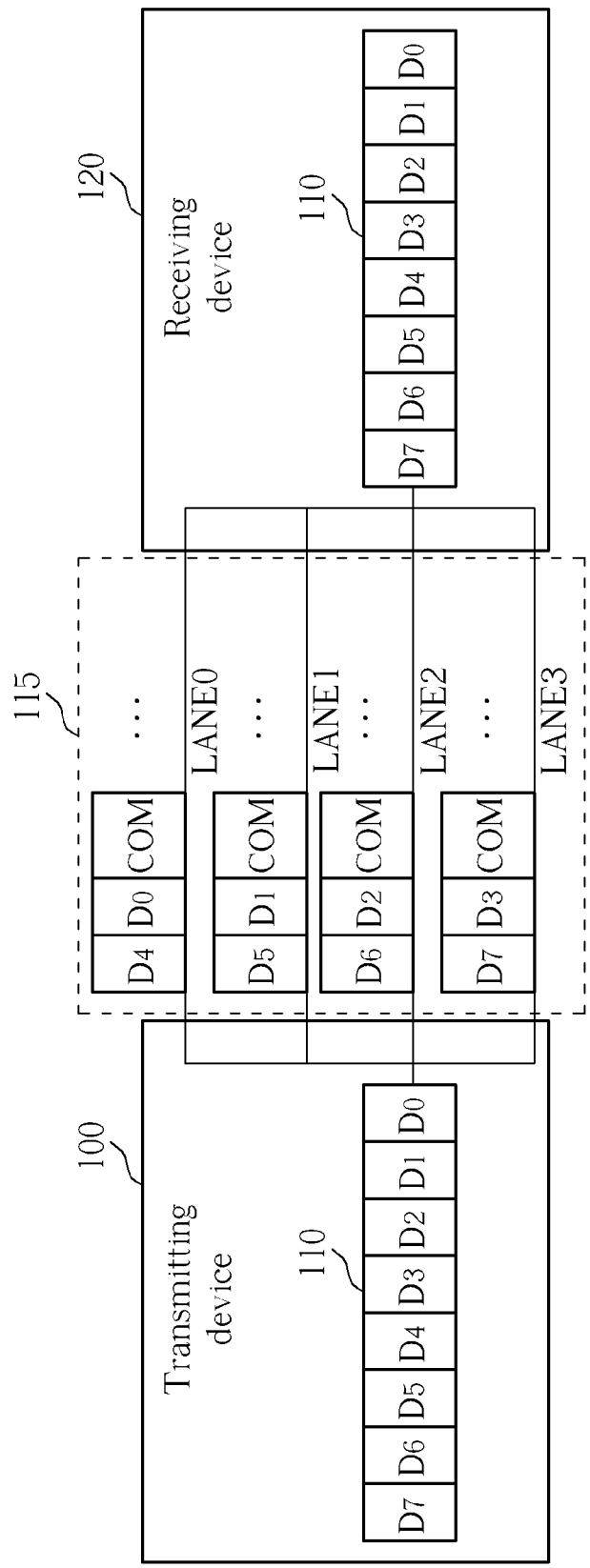
FIG. 1 is a diagram of a conventional PCI-Express bus utilizing a plurality of lanes to transmit data.
Figure 2:
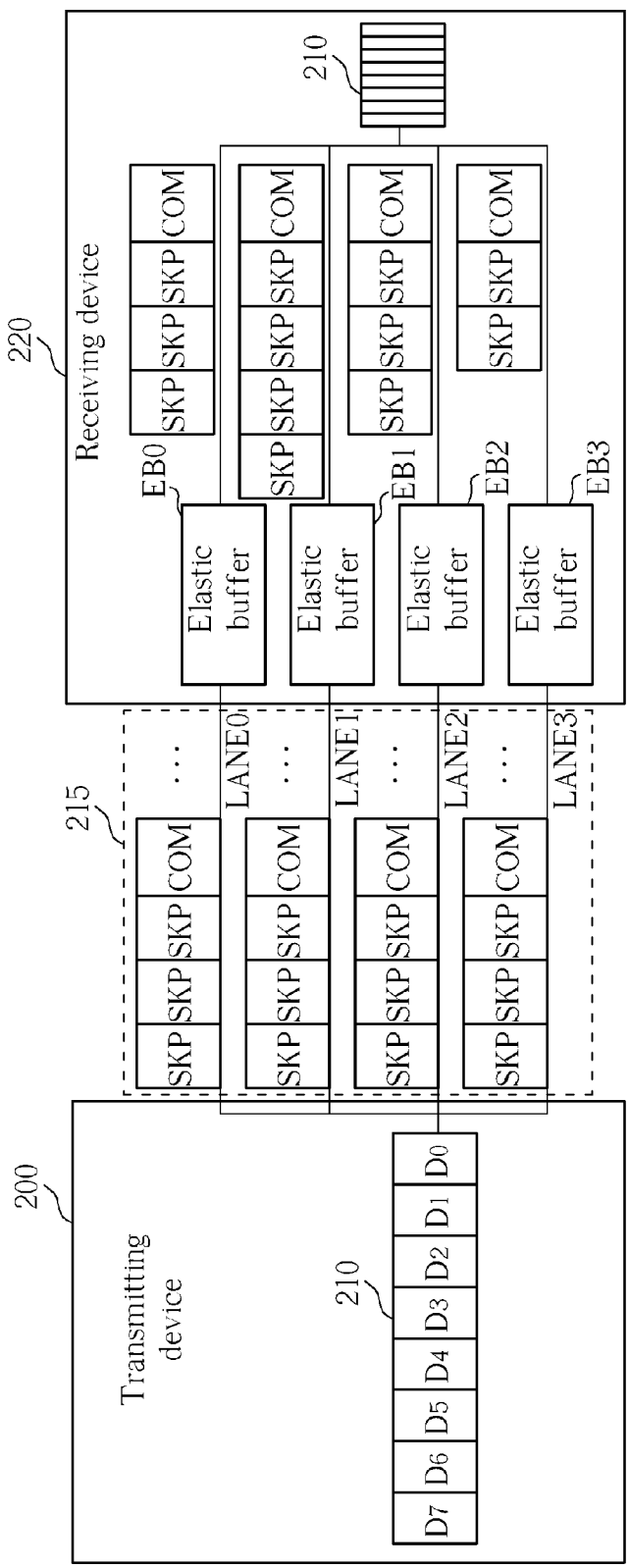
FIG. 2 is a diagram of another conventional PCI-Express bus utilizing a plurality of lanes to transmit data.
Figure 3:
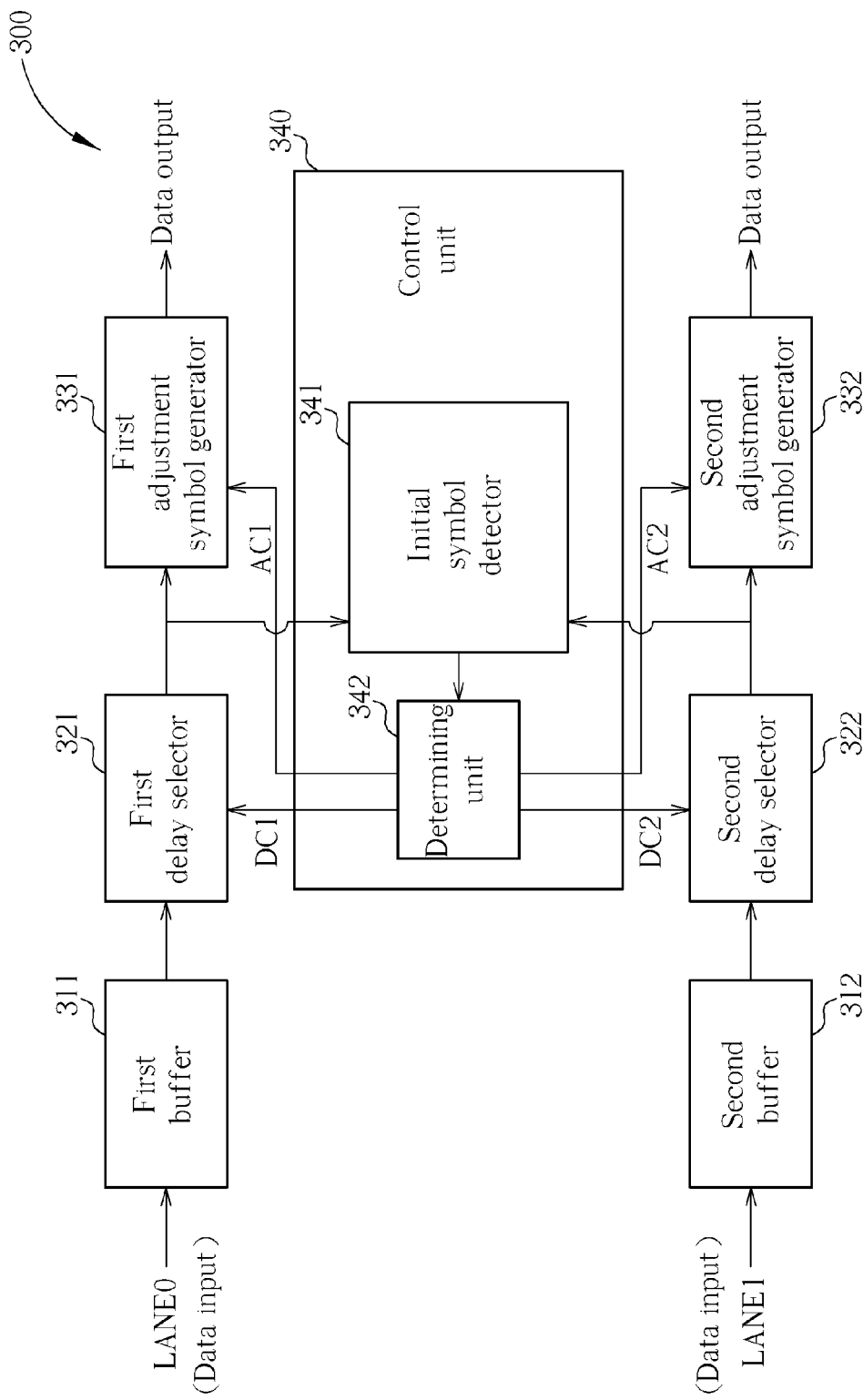
FIG. 3 is a block diagram showing a time aligning circuit according to a first embodiment of the present invention.

Please refer to FIG. 3, which is a block diagram showing a time aligning circuit according to a first embodiment of the present invention. As shown in FIG. 3, the time aligning circuit 300 is used for aligning a data transmission timing of a plurality of lanes. In this embodiment, the time aligning circuit 300 includes, but is not limited to, a plurality of buffers (such as a first buffer 311 and a second buffer 312), a plurality of delay selectors (such as a first delay selector 321 and a second delay selector 322), a plurality of adjustment symbol generators (such as a first adjustment symbol generator 331 and a second adjustment symbol generator 332), and a control unit 340. Please note that, those skilled in the art should appreciate each of the buffers 311 and 312 can be implemented by a register, a memory, or any element with data storage functions. In this embodiment, each of the buffers 311 and 312 may be implemented by a first-in first-out (FIFO)

register, but the present invention is not limited to this only. The structure and operations of the FIFO register is omitted here for brevity. Furthermore, in this embodiment, a number of the plurality of lanes equal to two, a number of the plurality of buffers equal to two, a number of the plurality of buffers equal to two, a number of the plurality of delay selectors equal to two, and a number of the plurality of adjustment symbol generators equal to two are cited as an example for describing the present invention, but this should not be considered as a limitation of the present invention.

As shown in FIG. 3, the first buffer 311 and the second buffer 312 are coupled to the lane LANE0 and the lanes LANE1, for receiving ordered sets transmitted on the lane LANE0 and the lane LANE1, respectively. The first delay selector 321 and the second delay selector 322 are coupled to the first buffer 311 and the second buffer 312, for delaying outputs of the ordered sets of the corresponding first buffer 311 and the second buffer 312 according to a first delay control signal DC1 and a second delay control signal DC2, respectively. The first adjustment symbol generator 331 and the second adjustment symbol generator 332 are coupled to the first delay selector 321 and the second delay selector 322, respectively, for outputting an adjustment symbol or for outputting the output received from the corresponding delay selector (i.e., the first delay selector 321 or the second delay selector 322) according to a first adjustment control signal AC1 and a second adjustment control signal AC2. Furthermore, the control unit 340 is coupled to the first delay selector 321, the second delay selector 322, the first adjustment symbol generator 331, and the second adjustment symbol generator 332, for generating the abovementioned first delay control signal DC1, the second delay control signal DC2, the first adjustment control signal AC1, and the second adjustment control signal AC2.

In this embodiment, the control unit 340 includes an initial symbol detector 341 and a determining unit 342. The initial symbol detector 341 is coupled to the first delay selector 321 and the second delay selector 322, for detecting initial symbols in the ordered sets outputted from the first delay selector 321 and the second delay selector 322. The determining unit 342 is coupled to the initial symbol detector 341, the first delay selector 321, the second delay selector 322, the first adjustment symbol generator 331, and the second adjustment symbol generator 332. When an initial symbol of the ordered sets outputted by a designated delay selector is detected but initial symbols of the ordered sets outputted by other delay selectors are not detected yet by the initial symbol detector 341, the determining unit 342 generates the delay control signal to the designated delay selector and generates the adjustment control signal to control a designated adjustment symbol generator corresponding to the designated delay selector in order to output one adjustment symbol until the initial signals of the ordered sets outputted by all delay selectors are detected by the initial symbol detector 341. Operations of the time aligning circuit 300 will be further detailed in the following embodiments.

Figure 4:
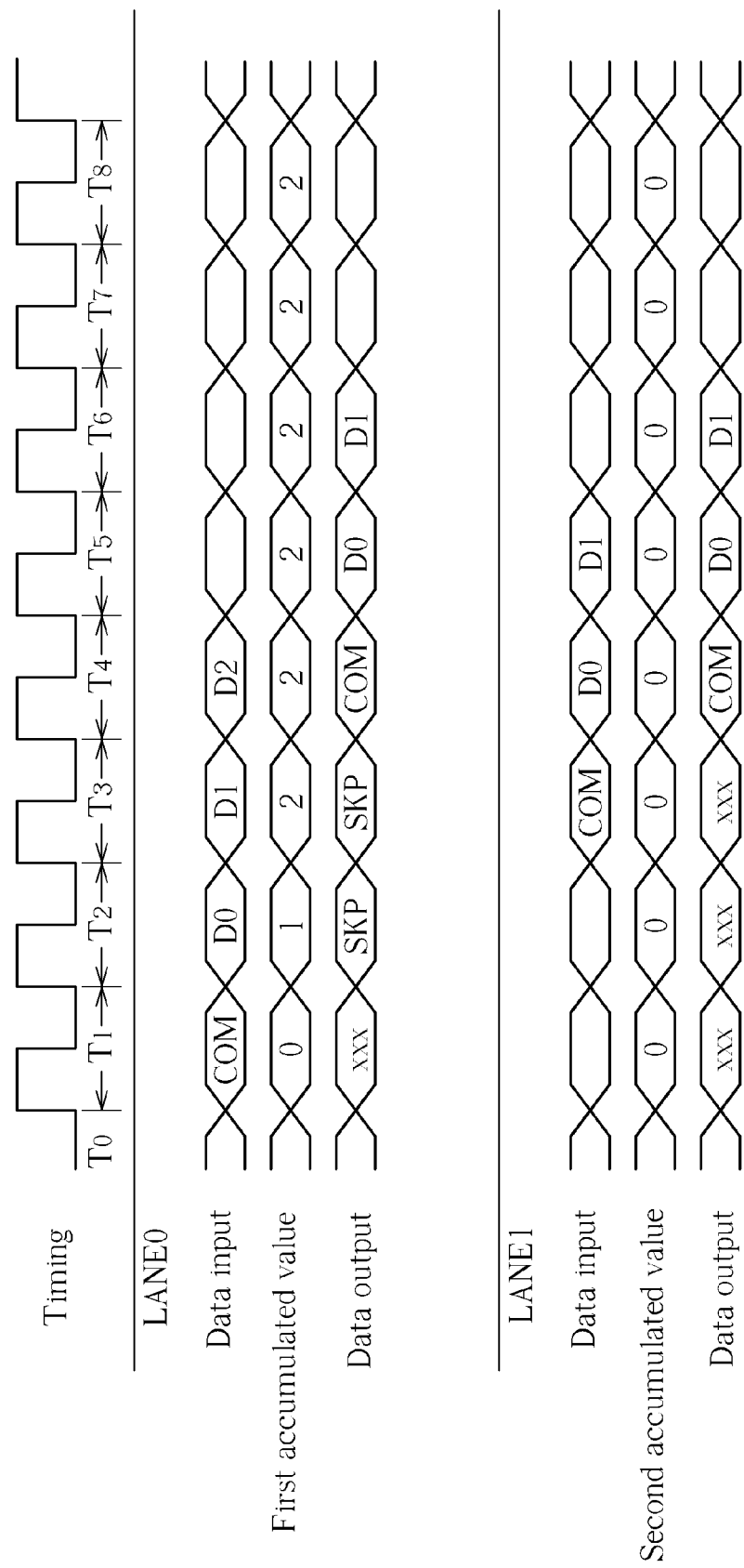
FIG. 4 is an operational diagram illustrating how the time aligning circuit shown in FIG. 3 aligns the data transmission timing of the plurality of lanes according to an embodiment of the present invention.

Please refer to FIG. 3 together with FIG. 4. FIG. 4 is an operational diagram illustrating how the time aligning circuit 300 shown in FIG. 3 aligns the data transmission timing of the plurality of lanes LANE0 and LANE1. First, the first buffer 311 receives the ordered sets transmitted on the lane LANE0 (at this time, the first buffer 311 has a first used depth equal to 1) and transmits the ordered sets to the first delay selector 321, and then the first delay selector 321 transmits the ordered sets to the first adjustment symbol generator 331 and the initial symbol detector 341. At the same time, the second buffer 312 receives the ordered sets transmitted on the lane LANE1 (at this time, the second buffer 312 has a second used depth equal to 1) and transmits the ordered sets to the second delay selector 322, and then the second delay selector 322 transmits the ordered sets to the second adjustment symbol generator 332 and the initial symbol detector 341. During a timing T1, the initial symbol COM in the ordered sets outputted from the first delay selector 321 is detected by the initial symbol detector 341 but the initial symbol COM in the ordered sets outputted from the second delay selector 322 is not detected yet by the initial symbol detector 341 (in this embodiment, the initial symbol COM in the ordered sets outputted from the second delay selector 322 is detected during a timing T3), and thus the determining unit 342 generates the first delay control signal DC1 to the first delay selector 321 for delaying the output. At this time, the first buffer 311 accordingly stores the received ordered sets (at this time, the first buffer 311 has the first used depth equal to 2). Moreover, since a count of the first delay control signal DC1 is accumulated as "1" by the determining unit 342, the first accumulated value is increased from "0" to "1" during a timing T2. The determining unit 342 further generates the first adjustment control signal AC1 to the first adjustment symbol generator 331 so as to control the first adjustment symbol generator 331 to output one adjustment symbol SKP during the timing T2.

During the timing T2 shown in FIG. 4, the initial symbol COM in the ordered sets outputted from the second delay selector 322 is not detected yet by the initial symbol detector 341. As a result, the determining unit 342 generates the first delay control signal DC1 to the first delay selector 321 once more for delaying the output. The first buffer 311 accordingly stores the received ordered sets (at this time, the first buffer 311 has the first used depth equal to 3). Moreover, since the count of the first delay control signal DC1 is accumulated as "2" by the determining unit 342, the first accumulated value is increased from "1" to "2" during the timing T3. The determining unit 342 further generates the first adjustment control signal AC1 to the first adjustment symbol generator 331 in order to control the first adjustment symbol generator 331 to output the adjustment symbol SKP once more during the timing T3.

Until the timing T3, the initial symbol COM in the ordered sets outputted from the second delay selector 322 is detected by the initial symbol detector 341. As a result, the determining unit 342 generates the first adjustment control signal AC1 to control the first adjustment symbol generator 331 to output the output result of the first delay selector 321. Please note that, the accumulated value generated from the count of the first delay control signal DC1 accumulated by the determining unit 342 is equal to "2". That is to say, the first used depth of the first buffer 311 is equal to 3. At the same time, the determining unit 342 generates the second adjustment control signal AC2 to control the second adjustment symbol generator 332 to output the output result of the second delay selector 332. Please note that, the accumulated value generated from the count of the second delay control signal DC2 accumulated by the determining unit 342 is equal to "0". That is to say, the second used depth of the second buffer 312 is equal to 1. Therefore, during the timing T4, the time aligning circuit 300 has already aligned the data transmission timing of the lanes LANE0 and LANE1, and the first adjustment symbol generator 331 and the second adjustment symbol generator 332 are capable of outputting data simultaneously. As shown in FIG. 4, the data outputs of first adjustment symbol generator 331 and the second adjustment symbol generator 332 are synchronized from the timing T4, and they start to sequentially output the initial symbol COM and a plurality of data bytes (e.g., D0 and D1) received from the corresponding lane.

Figure 5:
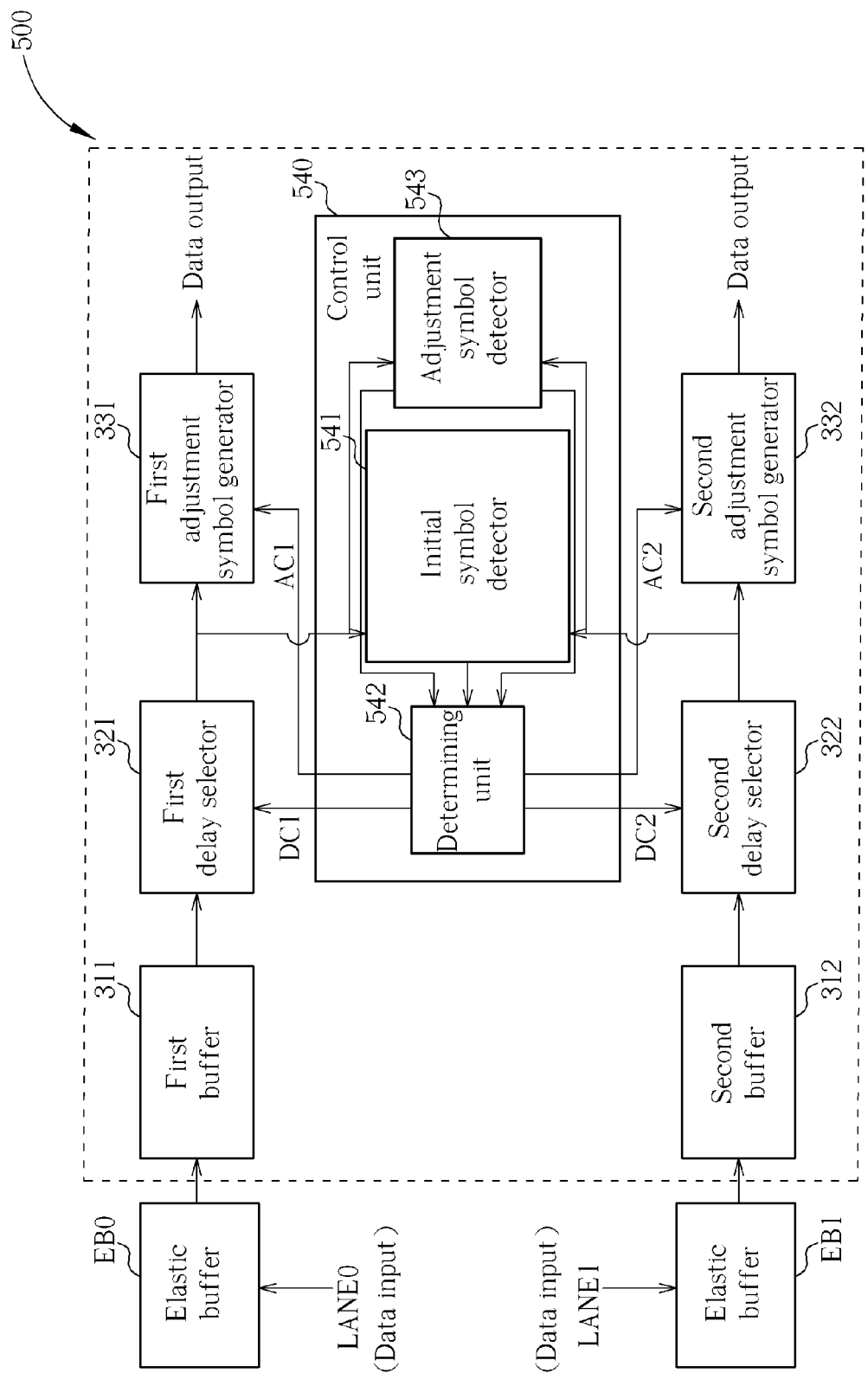
FIG. 5 is a block diagram showing a time aligning circuit according to a second embodiment of the present invention.

Please refer to FIG. 5, which is a block diagram showing a time aligning circuit 500 according to a second embodiment of the present invention. The architecture of the time aligning circuit 500 shown in FIG. 5 is similar to that of the time aligning circuit 300 shown in FIG. 3, and the major differences between them are that: a control unit 540 of the time aligning circuit 500 further includes an adjustment symbol detector 543 besides a determining unit 542 and an initial symbol detector 541, and the lane LANE0 and the lane LANE1 are coupled to an elastic buffer EB0 and an elastic buffer EB1, respectively. As shown in FIG. 5, the adjustment symbol detector 543 is coupled to the first delay selector 321 and the second delay selector 322, for detecting whether the elastic buffer EB0 and the elastic buffer EB1 adjust the number of the adjustment symbols SKP in the ordered sets. When the adjustment symbol detector 543 detects that a designated elastic buffer corresponding to a designated lane increases an adjustment symbol SKP to the ordered sets of a corresponding initial symbol of the designated lane, the determining unit 542 controls the adjustment symbol generators corresponding to the other lanes (i.e., the lanes other than the designated lane) to output an adjustment symbol SKP. On the other hand, when the adjustment symbol detector 543 detects that the designated elastic buffer decreases an adjustment symbol SKP from the ordered sets of the corresponding initial symbol of the designated lane, the determining unit 542 controls a designed adjustment symbol generator corresponding to the designated lane to output an adjustment symbol SKP. The operations of the time aligning circuit 500 are further detailed as below.

Figure 6:
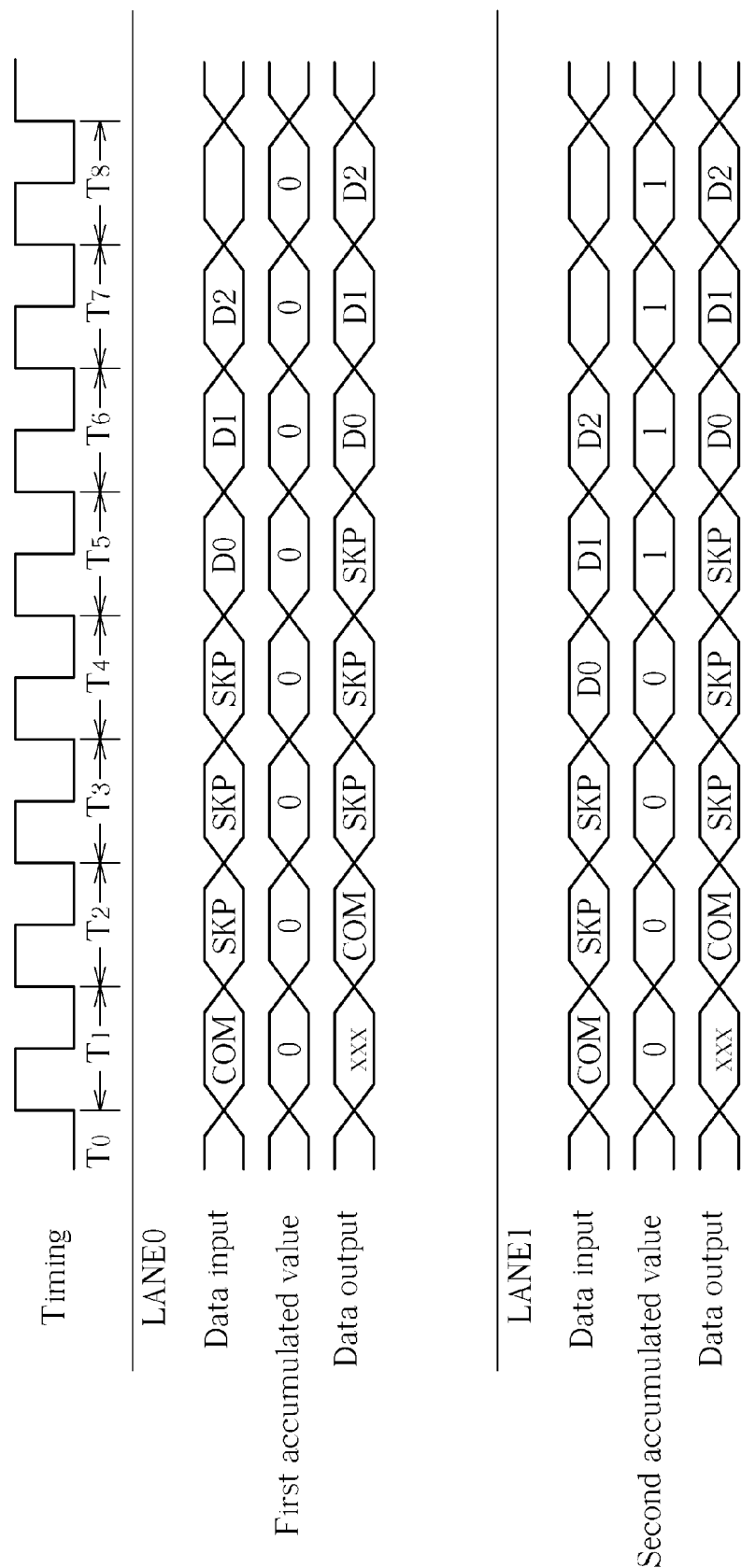
FIG. 6 is a diagram illustrating how the time aligning circuit shown in FIG. 5 aligns the data transmission timing of the plurality of lanes affected by elastic buffers according to an exemplary embodiment of the present invention.

Please refer to FIG. 5 together with FIG. 6. FIG. 6 is a diagram illustrating how the time aligning circuit 500 shown in FIG. 5 aligns the data transmission timing of the plurality of lanes LANE0 and LANE1 affected by elastic buffers EB0 and EB1 according to a first exemplary embodiment of the present invention. During the timing T1, the initial symbols COM in the ordered sets outputted from both the first delay selector 321 and the second delay selector 322 are detected by the initial symbol detector 541 at the same time, and thus the determining unit 542 generates the first adjustment control signal AC1 to control the first adjustment symbol generator 331 to output the output result of the first delay selector 321 (that is, during the timing T2, the initial symbol COM for the lane LANE0 will be outputted). At the same time, the determining unit 542 generates the second adjustment control signal AC2 to control the second adjustment symbol generator 332 to output the output result of the second delay selector 322 (that is, during the timing T2, the initial symbol COM for the lane LANE1 will be outputted). Until the timing T4, since the adjustment symbol detector 542 detects that the number of the adjustment symbol SKP of the elastic buffer EB1 corresponding to the lane LANE1 is smaller than that of the elastic buffer EB0 corresponding to the lane LANE0, the determining unit 542 generates the second delay control signal DC2 to the second delay selector 322 so as to delay its output. As a result, the second buffer 312 correspondingly stores the received ordered sets (at this time, the second used depth of the second buffer 312 is equal to 2). Furthermore, since a count of the second delay control signal DC2 is accumulated as "1" by the determining unit 542, the second accumulated value is increased from "0" to "1" during the timing T5. In addition, the determining unit 542 also generates the second adjustment control signal AC2 to the second adjustment symbol generator 332 so as to control the second adjustment symbol generator 332 to output one adjustment symbol SKP during the timing T5. Therefore, the first adjustment symbol generator 331 and the second adjustment symbol generator 332 are capable of outputting data simultaneously during the timing T6. As shown in FIG. 6, the data outputs of first adjustment symbol generator 331 and the second adjustment symbol generator 332 are synchronized from the timing T6, and they start to sequentially output the plurality of data bytes (e.g., D0, D1 and D2) received from the corresponding lane.

Figure 7:
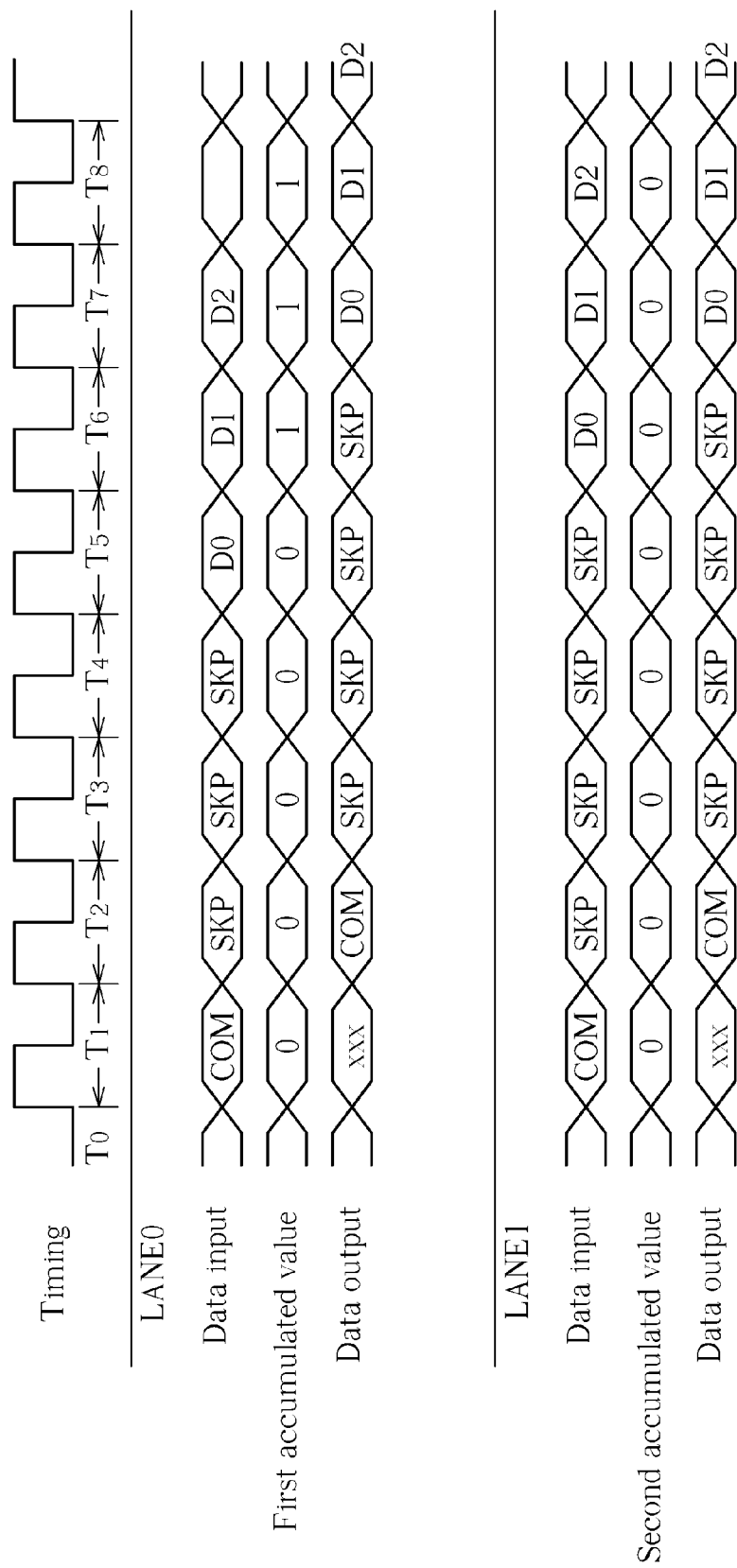
FIG. 7 is a diagram illustrating how the time aligning circuit shown in FIG. 5 aligns the data transmission timing of the plurality of lanes affected by elastic buffers according to another exemplary embodiment of the present invention.

Please refer to FIG. 5 together with FIG. 7. FIG. 7 is a diagram illustrating how the time aligning circuit 500 shown in FIG. 5 aligns the data transmission timing of the plurality of lanes LANE0 and LANE1 affected by elastic buffers EB0 and EB1 according to a second exemplary embodiment of the present invention. The operations shown in FIG. 7 are similar to that shown in FIG. 6, and the difference between them is that: the number of the adjustment symbol SKP in the lane LANE1 is less than that in the lane LANE0 in FIG. 6, but the number of the adjustment symbol SKP in the lane LANE1 is more than that in the lane LANE0 in FIG. 7. As a result, during the timing T5, since the adjustment symbol detector 542 detects that the number of the adjustment symbol SKP of the elastic buffer EB1 in the lane LANE1 is more than that of the elastic buffer EB0 in the lane LANE0, the determining unit 542 generates the first delay control signal DC1 to the first delay selector 321 so as to control the first delay selector 321 to delay the output result. As a result, the first buffer 311 accordingly stores the received ordered sets (at this time, the first buffer 311 has the first used depth equal to 2). Moreover, since a count of the first delay control signal DC1 is accumulated as "1" by the determining unit 542, the first accumulated value is increased from "0" to "1" during a timing T6. The determining unit 542 further generates the first adjustment control signal AC1 to the first adjustment symbol generator 331 so as to control the first adjustment symbol generator 331 to output one adjustment symbol SKP during the timing T6. Therefore, during the timing T7, the first adjustment symbol generator 331 and the second adjustment symbol generator 332 are capable of outputting data simultaneously. As shown in FIG. 7, the data outputs of first adjustment symbol generator 331 and the second adjustment symbol generator 332 are synchronized from the timing T7, and they start to sequentially output the plurality of data bytes (e.g., D0, D1 and D2) received from the corresponding lane.

Please note that, the concept of the time aligning circuit 500 is that: when the adjustment symbol detector 542 detects that the number of the adjustment symbol SKP in a designed lane is less than the number of the adjustment symbol SKP in other lanes, the determining unit 542 generates the delay control signal corresponding to the designated lane to a designated delay selector so as to control the delay selector to delay the output result, and generates the adjustment control signal to control the adjustment symbol generator to output an adjustment symbol SKP. As a result, the offset of the data transmission timing can be calibrated in order to make the first adjustment symbol generator 331 and the second adjustment symbol generator 332 synchronously output data.

Figure 8:
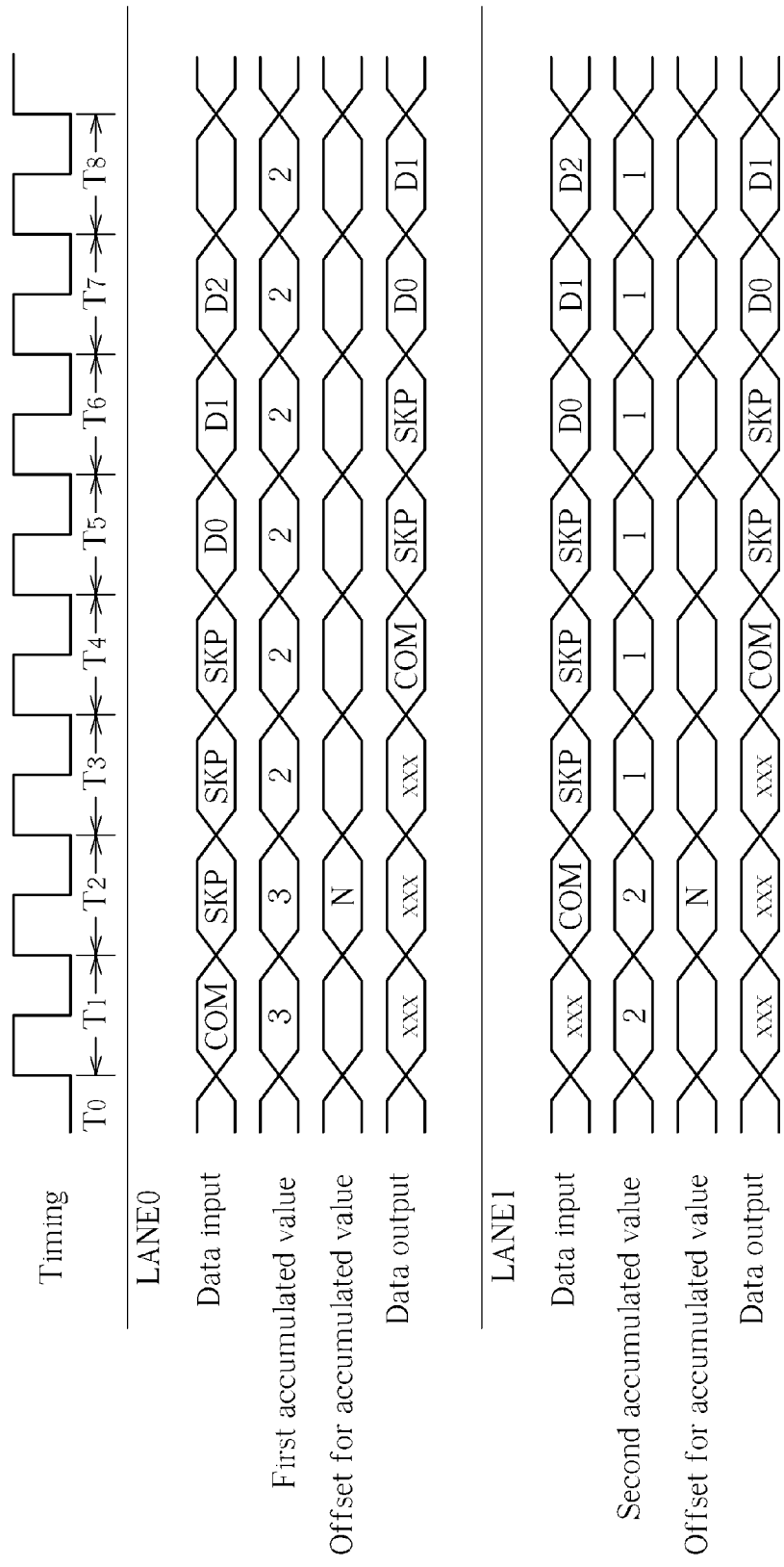
FIG. 8 is a diagram illustrating how the time aligning circuit aligns the data transmission timing of the plurality of lanes according to still another exemplary embodiment of the present invention.

Please refer to FIG. 8, which is a diagram illustrating how the time aligning circuit aligns the data transmission timing of the plurality of lanes LANE0 and LANE1 according to still another exemplary embodiment of the present invention. As shown in FIG. 8, during the timing T2, the data transmission timing of the lanes LANE0 and LANE1 has already been calibrated by the control unit 340/540. Please note that, how the control unit 340/540 calibrates the data transmission timing of the lanes LANE0 and LANE1 are detailed in the abovementioned embodiments, and further descriptions are omitted herein. If the first accumulated value is equal to 3 and the second accumulated value is equal to 2 during the timing T2 (that is to say, the first buffer 311 has the first used depth equal to 4 and the second buffer 312 has the second used depth equal to 3), the determining unit 342/542 subtracts an offset "N" (the offset "N" has a maximum value equal to the number of the adjustment symbols) from the first accumulated value and the second accumulated value to generate a first modified accumulated value and a second modified accumulated, respectively, and updates the first delay control signal DC1 and the second delay control signal DC2 to decrease the number of the adjustment symbols according to the modified accumulated values, such that the used space of the buffers can be saved. In this embodiment, the offset equal to 1 (N=1) is subtracted from the first accumulated value and the second accumulated value simultaneously. Therefore, the modified accumulated value is equal to 2 and the second modified accumulated value is equal to 1, and thus the first used depth of the first buffer is decreased to 3 and the second used depth of the second buffer is decreased to 2.

Figure 9:
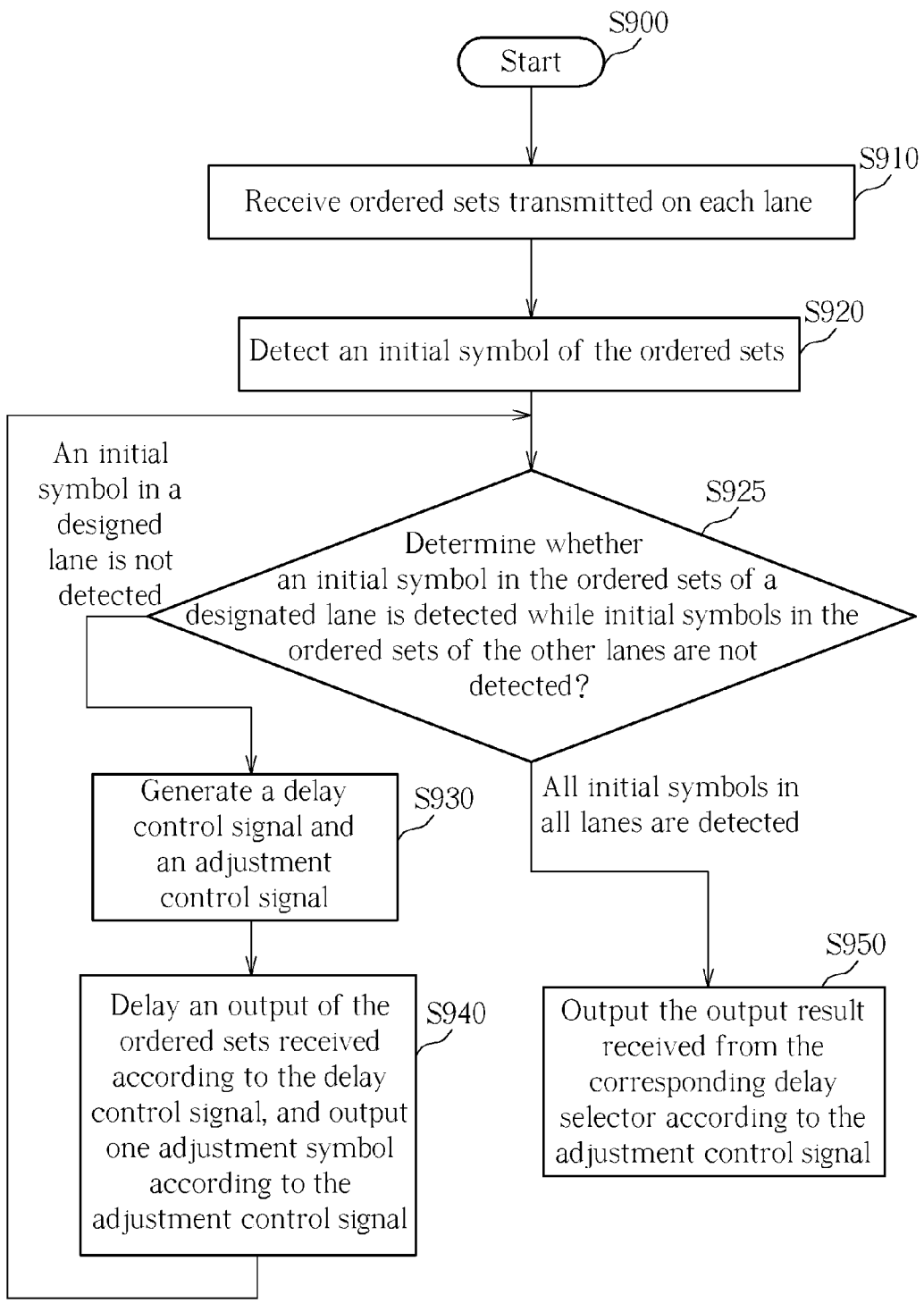
FIG. 9 is a flowchart illustrating a time aligning method for aligning data transmission timing of a plurality of lanes according to an exemplary embodiment of the present invention.

Please refer to FIG. 9, which is a flowchart illustrating a time aligning method for aligning data transmission timing of a plurality of lanes according to an exemplary embodiment of the present invention. Please note that the following steps are not limited to be performed according to the exact sequence shown in FIG. 9 if a roughly identical result can be obtained. The method includes, but is not limited to, the following steps:

Step S900: Start.

Step S910: Receive ordered sets transmitted on each lane.

Step S920: Detect an initial symbol of the ordered sets.

Step S925: Determine whether an initial symbol in the ordered sets of a designated lane is detected while initial symbols in the ordered sets of the other lanes are not detected. If yes, go to step S930; and if the initial symbols in the ordered sets of all lanes are detected, go to step S950.

Step S930: Generate a delay control signal and an adjustment control signal.

Step S940: Delay an output of the ordered sets received according to the delay control signal, and output one adjustment symbol according to the adjustment control signal. After that, go back to the step S925.

Step S950: Output the output result received from the corresponding delay selector according to the adjustment control signal.

How each element operates can be known by collocating the steps shown in FIG. 9 and the elements shown in FIG. 3, and further description is omitted here for brevity.

Figure 10:
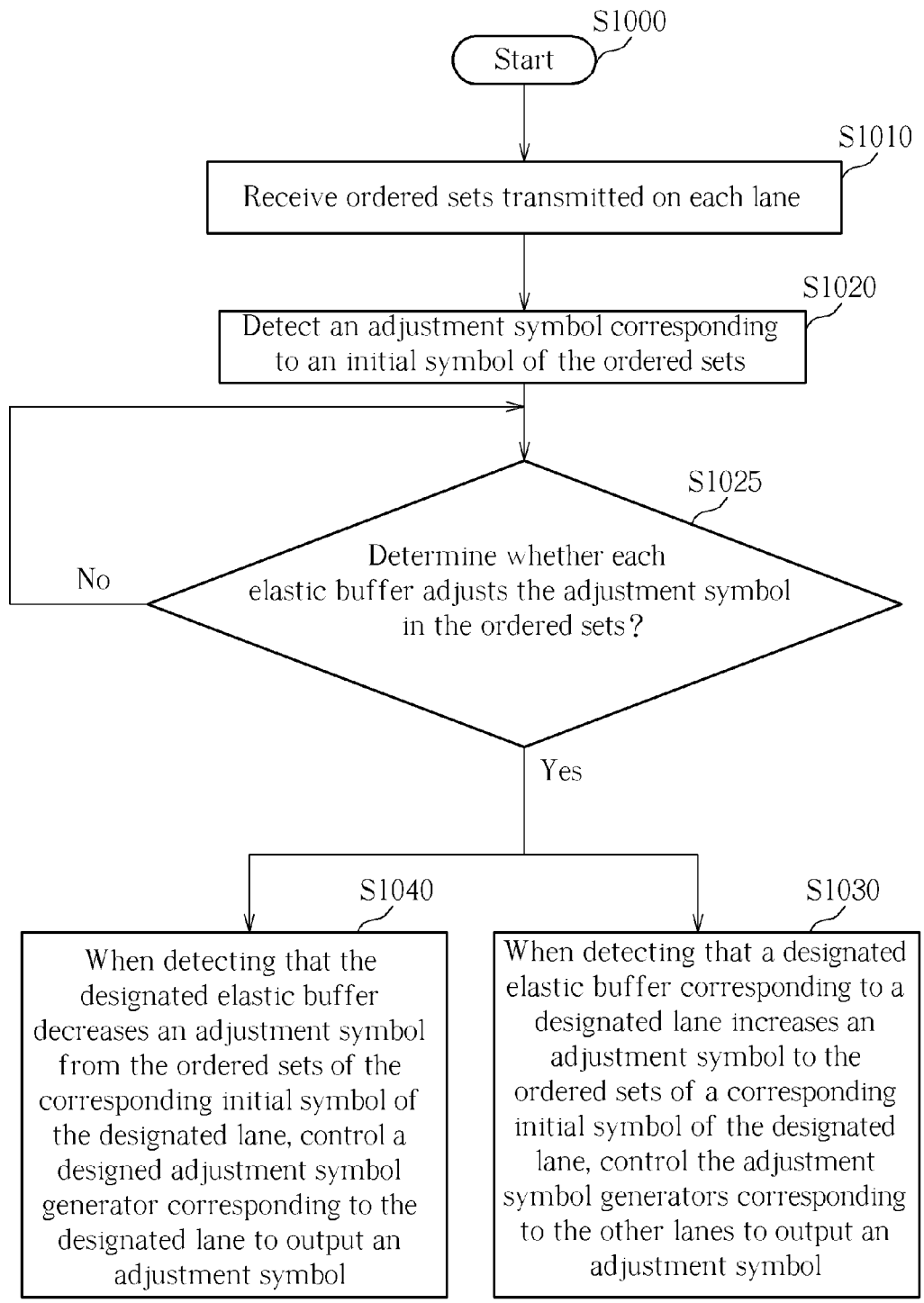
FIG. 10 is a flowchart illustrating a time aligning method for aligning data transmission timing of a plurality of lanes according to another exemplary embodiment of the present invention.

Please refer to FIG. 10, which is a flowchart illustrating a time aligning method for aligning data transmission timing of a plurality of lanes according to another exemplary embodiment of the present invention. Please note that the following steps are not limited to be performed according to the exact sequence shown in FIG. 10 if a roughly identical result can be obtained. The method includes, but is not limited to, the following steps:

Step S1000: Start.

Step S1010: Receive ordered sets transmitted on each lane.

Step S1020: Detect an adjustment symbol corresponding to an initial symbol of the ordered sets.

Step S1025: Determine whether each elastic buffer adjusts the adjustment symbol in the ordered sets. If yes, go to step S1030; otherwise, go to step S1020.

Step S1030: when detecting that a designated elastic buffer corresponding to a designated lane increases an adjustment symbol to the ordered sets of a corresponding initial symbol of the designated lane, control the adjustment symbol generators corresponding to the other lanes to output an adjustment symbol.

Step S1040: When detecting that the designated elastic buffer decreases an adjustment symbol from the ordered sets of the corresponding initial symbol of the designated lane, control a designed adjustment symbol generator corresponding to the designated lane to output an adjustment symbol.

How each element operates can be known by collocating the steps shown in FIG. 10 and the elements shown in FIG. 5, and further description is omitted here for brevity.

Figure 11:
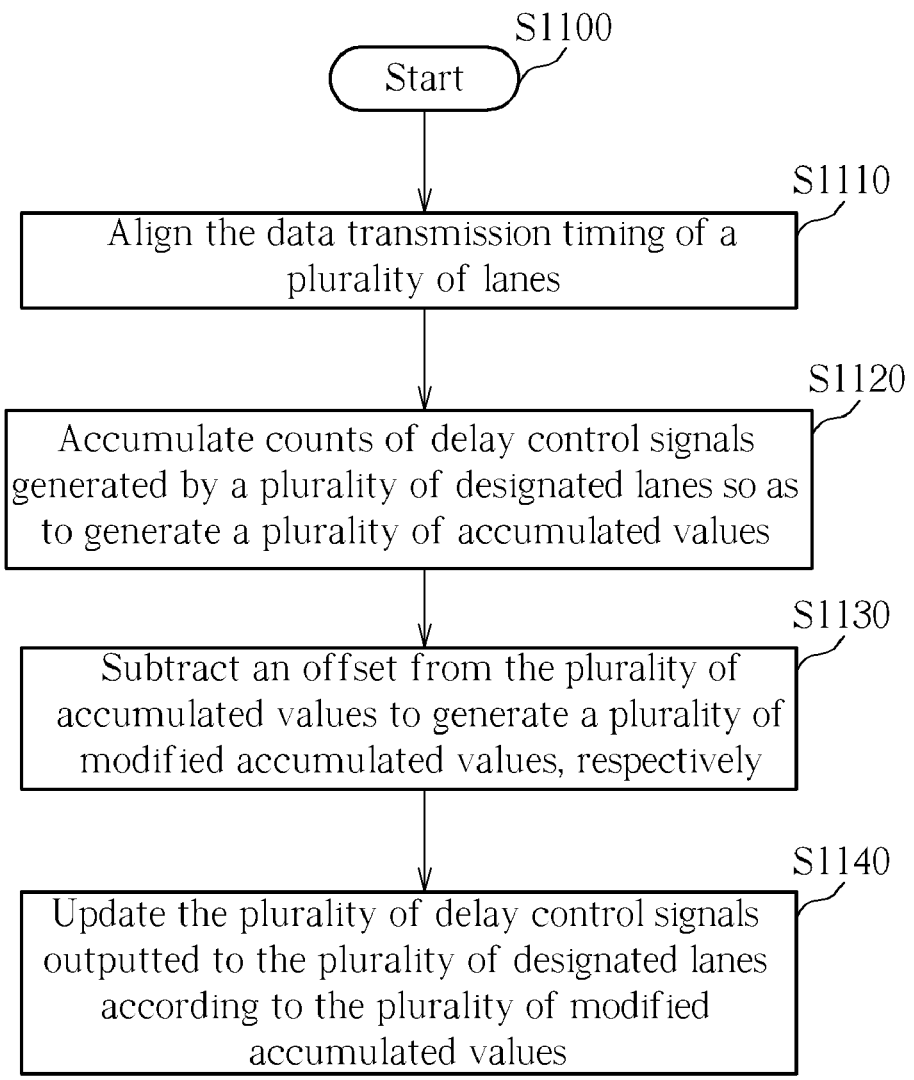
FIG. 11 is a flowchart illustrating a time aligning method for aligning data transmission timing of a plurality of lanes according to still another exemplary embodiment of the present invention.

Please refer to FIG. 11, which is a flowchart illustrating a time aligning method for aligning data transmission timing of a plurality of lanes according to still another exemplary embodiment of the present invention. Please note that the following steps are not limited to be performed according to the exact sequence shown in FIG. 11 if a roughly identical result can be obtained. The method includes, but is not limited to, the following steps:

Step S1100: Start.

Step S1110: Align the data transmission timing of a plurality of lanes.

Step S1120: Accumulate counts of delay control signals generated by a plurality of designated lanes so as to generate a plurality of accumulated values.

Step S1130: Subtract an offset from the plurality of accumulated values to generate a plurality of modified accumulated values, respectively.

Step S1140: Update the plurality of delay control signals outputted to the plurality of designated lanes according to the plurality of modified accumulated values.

How each element operates can be known by collocating the steps shown in FIG. 11 and the elements shown in FIG. 5, and further description is omitted here for brevity.

Please note that, the steps of the abovementioned flowchart are merely a practicable embodiment of the present invention, and in no way should be considered to be limitations of the scope of the present invention. The method can include other intermediate steps or several steps can be merged into a single step without departing from the spirit of the present invention.

The abovementioned embodiments are presented merely for describing features of the present invention, and in no way should be considered to be limitations of the scope of the present invention.

In summary, the present invention provides a time aligning circuit and a related time aligning method. The time aligning circuit/method provided in the present invention is capable of aligning a plurality of lanes (which can be implemented by different traces or different cables). Therefore, the offset problems of the data transmission timing caused by different lengths, temperature effects, voltage change of power supplies, different channel qualities, or data rate compensation by elastic buffers can be solved. Furthermore, by updating the accumulated values, the used space of the buffers can be further saved.

Those skilled in the art will readily observe that numerous modifications and alterations of the device and method may be made while retaining the teachings of the invention.

What is claimed is:

1. A time aligning circuit for aligning a data transmission timing of a plurality of lanes, comprising:

a plurality of buffers, respectively coupled to the plurality of lanes, wherein each buffer is used for receiving ordered sets transmitted on the corresponding lane;

a plurality of delay selectors, respectively coupled to the plurality of buffers, wherein each delay selector is used for delaying an output of the ordered sets of the corresponding buffer according to a delay control signal;

a plurality of adjustment symbol generators, respectively coupled to the plurality of delay selectors, wherein each adjustment symbol generator is used for outputting an adjustment symbol or for outputting the output received from the corresponding delay selector according to an adjustment control signal; and a control unit, coupled to the plurality of delay selectors and the plurality of adjustment symbols generators, for generating the delay control signal and the adjustment control signal, the control unit comprising:

an initial symbol detector, coupled to the plurality of delay selectors, for detecting an initial symbol of the ordered sets outputted from the plurality of delay selectors; and a determining unit, coupled to the initial symbol detector, the plurality of delay selectors, and the plurality of adjustment symbol generators;

wherein when an initial symbol of the ordered sets outputted by a designated delay selector is detected but initial symbols of the ordered sets outputted by other delay selectors are not received yet, the determining unit generates the delay control signal to the designated delay selector and generates the adjustment control signal to control a designated adjustment symbol generator corresponding to the designated delay selector in order to output one adjustment symbol until the initial signals of the ordered sets outputted by all delay selectors are detected.

2. The time aligning circuit of claim 1, wherein the plurality of lanes are coupled to a plurality of elastic buffers, respectively; and control unit further comprises an adjustment symbol detector coupled to the plurality of delay selectors, for detecting whether each elastic buffer adjusts the adjustment symbol in the ordered sets; when the adjustment symbol detector detects that a designated elastic buffer corresponding to a designated lane increases an adjustment symbol to the ordered sets of a corresponding initial symbol of the designated lane, the determining unit controls the adjustment symbol generators corresponding to the other lanes to output an adjustment symbol; and when the adjustment symbol detector detects that the designated elastic buffer decreases an adjustment symbol from the ordered sets of the corresponding initial symbol of the designated lane, the determining unit controls a designed adjustment symbol generator corresponding to the designated lane to output an adjustment symbol.

3. The time aligning circuit of claim 2, wherein the control unit further accumulates counts of delay control signals generated by a plurality of designated delay selectors so as to generate a plurality of accumulated values; and after the control unit aligns the data transmission timing of the plurality of lanes, the determining unit subtracts an offset from the plurality of accumulated values to generate a plurality of modified accumulated values, respectively, and updates the plurality of delay control signals outputted to the plurality of designated delay selectors according to the plurality of modified accumulated values.

4. The time aligning circuit of claim 1, wherein the control unit further accumulates counts of delay control signals generated by a plurality of designated delay selectors so as to generate a plurality of accumulated values; and after the control unit aligns the data transmission timing of the plurality of lanes, the determining unit subtracts an offset from the plurality of accumulated values to generate a plurality of modified accumulated values, respectively, and updates the plurality of delay control signals outputted to the plurality of designated delay selectors according to the plurality of modified accumulated values.

5. The time aligning circuit of claim 1, wherein the initial symbol is a COM symbol of PCI-Express, and the adjustment symbol is a SKP symbol of PCI-Express.

6. A time aligning method for aligning a data transmission timing of a plurality of lanes, comprising the following steps:
receiving ordered sets transmitted on each lane;
detecting an initial symbol of the ordered sets received by the plurality of lanes; and
when an initial symbol of the ordered sets on a designated lane is detected but initial symbols of the ordered sets on the other lanes are not received yet, generating a delay control signal to delay an output of the ordered sets received from the lanes and generating an adjustment control signal to control a designated adjustment symbol generator corresponding to the designated lane to output one adjustment symbol until the initial signals of the ordered sets on all lanes are detected.

7. The time aligning method of claim 6, wherein the plurality of lanes are coupled to a plurality of elastic buffers, respectively; and the method further comprises:
detecting whether each elastic buffer adjusts the adjustment symbol in the ordered sets;
when detecting that a designated elastic buffer corresponding to a designated lane increases an adjustment symbol to the ordered sets of a corresponding initial symbol of the designated lane, controlling the adjustment symbol generators corresponding to the other lanes to output an adjustment symbol; and
when detecting that the elastic buffer decreases an adjustment symbol from the ordered sets of the corresponding initial symbol of the designated lane, controlling a designed adjustment symbol generator corresponding to the designated lane to output an adjustment symbol.

8. The time aligning method of claim 7, further comprising:
accumulating counts of delay control signals generated for a plurality of designated lanes so as to generate a plurality of accumulated values; and
after the data transmission timing of the plurality of lanes is aligned, subtracting an offset from the plurality of accumulated values to generate a plurality of modified accumulated values, respectively, and updating the plurality of delay control signals outputted to the plurality of designated lanes according to the plurality of modified accumulated values.

9. The time aligning method of claim 6, further comprising:
accumulating counts of delay control signals generated for a plurality of designated lanes so as to generate a plurality of accumulated values; and
after the data transmission timing of the plurality of lanes is aligned, subtracting an offset from the plurality of accumulated values to generate a plurality of modified accumulated values, respectively, and updating the plurality of delay control signals outputted to the plurality of designated lanes according to the plurality of modified accumulated values.

10. The time aligning method of claim 6, wherein the initial symbol is a COM symbol of PCI-Express, and the adjustment symbol is a SKP symbol of PCI-Express.

* * * * *